3,323,952
METHOD FOR FORMING BRAKE DRUMS
Earl W. Reinsch, Dayton, and John B. McKee, Clayton, Ohio, assignors to General Motors Corporation, Detroit, Mich., a corporation of Delaware
Filed Mar. 12, 1965, Ser. No. 439,309
3 Claims. (Cl. 148—12)

ABSTRACT OF THE DISCLOSURE

Sheet steel, containing 0.60% to 0.85% by weight carbon, is annealed to spheroidize at least 75% of the carbide particles present therein, and subsequently cold formed into a brake drum suitable for use in combination with a sintered, ferrous metal, brake lining without scorching.

---

This invention relates to friction elements and is particularly concerned with automotive brakes, clutches and the like utilizing sintered ferrous linings in combination with steel rubbing surfaces such as brake drums and to the method for forming such brake drums.

It is the main object of the invention to provide a method for forming brake drums of suitable material for use as rubbing surfaces in combination with sintered ferrous brake lining materials.

In carrying out this object it is a further object to provide a method wherein steel for brake drums having between 0.60% and 0.85% by weight of combined carbon, is rolled into sheet stock and is then annealed to spheroidize at least 75% of the cementite or carbide particles therein whereby the said steel is sufficiently ductile to permit cold forming of brake drums directly therefrom.

Figure 1:
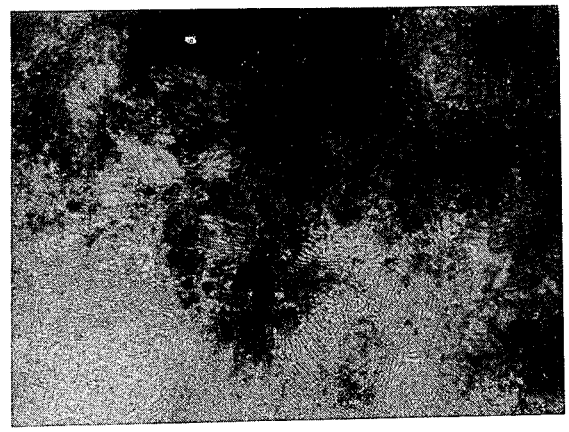
Figure 2:
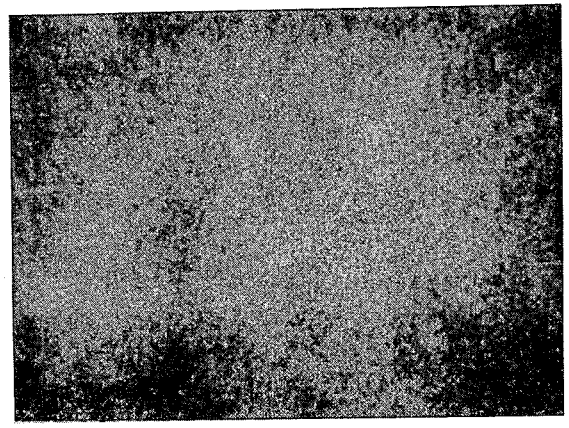

Further objects and advantages will be apparent, reference being had to the accompanying drawings, wherein:

FIG. 1 is a photomicrograph at 500 diameters of conventional SAE 1080 steel showing a 100% pearlitic structure, and FIG. 2 is a photomicrograph at 500 diameters showing the same steel wherein substantially all of the carbides have been spheroidized whereby a satisfactory steel for cold forming operations is provided.

In application Ser. No. 217,426 filed Aug. 16, 1962, now Patent No. 3,184,001, and assigned to the assignee of the present invention, a combination of elements has been disclosed for torque transmitting and/or energy absorbing devices and specifically brakes wherein the combination comprises a brake lining or surface of sintered ferrous material for use in combination with a steel braking surface. In said copending application the steel brake surface is one substantially free from free ferrite and as one example, an SAE 1080 steel is given as a highly satisfactory material. Under normal metallurgical and industrial practices these steels are not required to be readily cold formable.

When using SAE 1080 steel and steels having from between 0.60% and 0.85% by weight of carbon therein it has been necessary in the past to form the material from the hot condition since the steel is relatively brittle and cannot be cold formed satisfactorily. This, of course, in no way lessens its desirability as a rubbing surface in disc brakes and similar structures where forming is not necessary and provides excellent properties in the combination. However, the requirement for hot forming brake drums has to a large degree reduced the usefulness of this material because of cost.

We have found that it is now possible to produce SAE 1080 steel and steels of similar character wherein the material is easily cold formed and this improved condition is obtained through a specific treatment prior to the cold forming step. High carbon steels including from 0.60% and 0.85% by weight of combined carbon may all be produced by similar procedures as follows:

The ingot, slab or other form of raw material is rolled into sheet stock of the desired thickness either hot or cold, according to mill procedure. This sheet stock is next annealed and this step is of utmost importance if a satisfactory cold formable material is to be obtained. The annealing is accomplished at elevated temperatures and is continued for a time sufficient to spheroidize at least about 75% of the carbide particles present. This is an important limitation since spheroidization of lesser percentages of the carbode particles does not render the steel sufficiently ductile for cold working of the order required to form a brake drum. We have found that carbide in the pearlitic structure of the initial material must be substantially spheroidized if a satisfactory material is to be formed that can be cold worked. Thereafter, the spheroidized sheet stock may be cut into blanks and may be cold formed directly into brake drums which have a spheroidized carbide structure.

The spheroidizing may be accomplished at the mill by heating the steel in sheet form, i.e. strip or sheet, to just below the lower transformation temperature of about 1350° F. (satisfactory for SAE 1080 steel) for a time sufficient to convert at least about 75% of the cementite (carbide) constituent of the pearlite into spherical or globular form. The time of treatment will vary in accordance with the load being treated, initial steel structure, and the furnace used. The proper conditions for spheroidizing may be initially determined in view of the specific variables by metallographic examination whereby a satisfactory and workable structure is shown in FIG. 2 herein.

The mill annealed steel stock with a properly spheroidized structure is relatively easy to cold form whereas the same steel without the spheroidized structure is brittle and relatively difficult if not impossible to cold form.

In making brake drums for rubbing contact with sintered ferrous linings for use in automotive vehicles, we have found that steel strips of SAE 1080 steel and equivalents noted herein having a thickness of from .200 in. to .235 in. and preferably about .229 in., can be readily cold formed to make highly useful brake drums for use with the sintered ferrous linings as disclosed in the aforementioned copending application. Variations from this optimum may be practiced within economic limits according to the strength required.

This invention is one of great economic importance, SAE 1080 steel and other steels having a carbon content within the range of from 0.60% and 0.85% by weight have the desired metallographic structure devoid of free ferrite and may be used directly as satisfactory rubbing surfaces with sintered ferrous linings. However, in the past these highly desirable SAE steels required a hot forming step in order to produce a satisfactory brake drum due to the inherent brittleness of the steel. This step, in addition to the added cost of the heat treatment, made tooling expenses higher due to increased die wear. Further, hot forming increases the problems involved in maintaining dimensional tolerances and further adds to the ultimate cost of the product.

By heat treating the steel stock in sheet form at the mill, the cost of the treatment adds little to the ultimate cost per pound of the stock but reduces the cost of the manufacture of the brake drums tremendously through the elimination of the previously used heating step and the lessening of die erosion and attendant die wear and produces a product which is easier to maintain within specific dimensional tolerances required.

Thus, the present invention provides a greatly improved method for manufacturing brake drums wherein steel stock is heat treated in bulk form for making the same readily cold formable and is subsequently blanked and formed cold into brake drums at a great savings to the manufacturer.

While the embodiments of the present invention as herein disclosed, constitute preferred forms, it is to be understood that other forms might be adopted.

What is claimed is as follows:

1. In a method for making an arcuately shaped steel brake drum for use in combination with a sintered, ferrous brake lining material, the steps comprising; selecting a steel having between 0.60% and 0.85% by weight of combined carbon, rolling said steel into sheet stock, annealing said sheet stock for a time and at a temperature sufficient to spheroidize at least about 75% of the carbide particles therein, cutting blanks from said spheroidized sheet, and then cold forming said blanks directly into brake drums whereby said drums have a spheroidized carbide metallographic structure as formed.

2. The method claimed in claim 1 wherein the steel selected is SAE 1080 steel.

3. The method claimed in claim 2 wherein the sheet stock from said rolling step has a thickness of about .229 inch.

References Cited

UNITED STATES PATENTS

| 1,900,804 | 1/1931 | Crowe | 188—218 X |
| 2,084,814 | 1/1934 | Jeune | 188—218 X |
| 2,151,568 | 9/1939 | Sinclair | 188—218 X |

FOREIGN PATENTS

| 545,256 | 8/1957 | Canada. |

DAVID L. RECK, *Primary Examiner.*

H. SAITO, *Assistant Examiner.*